Patented July 31, 1945

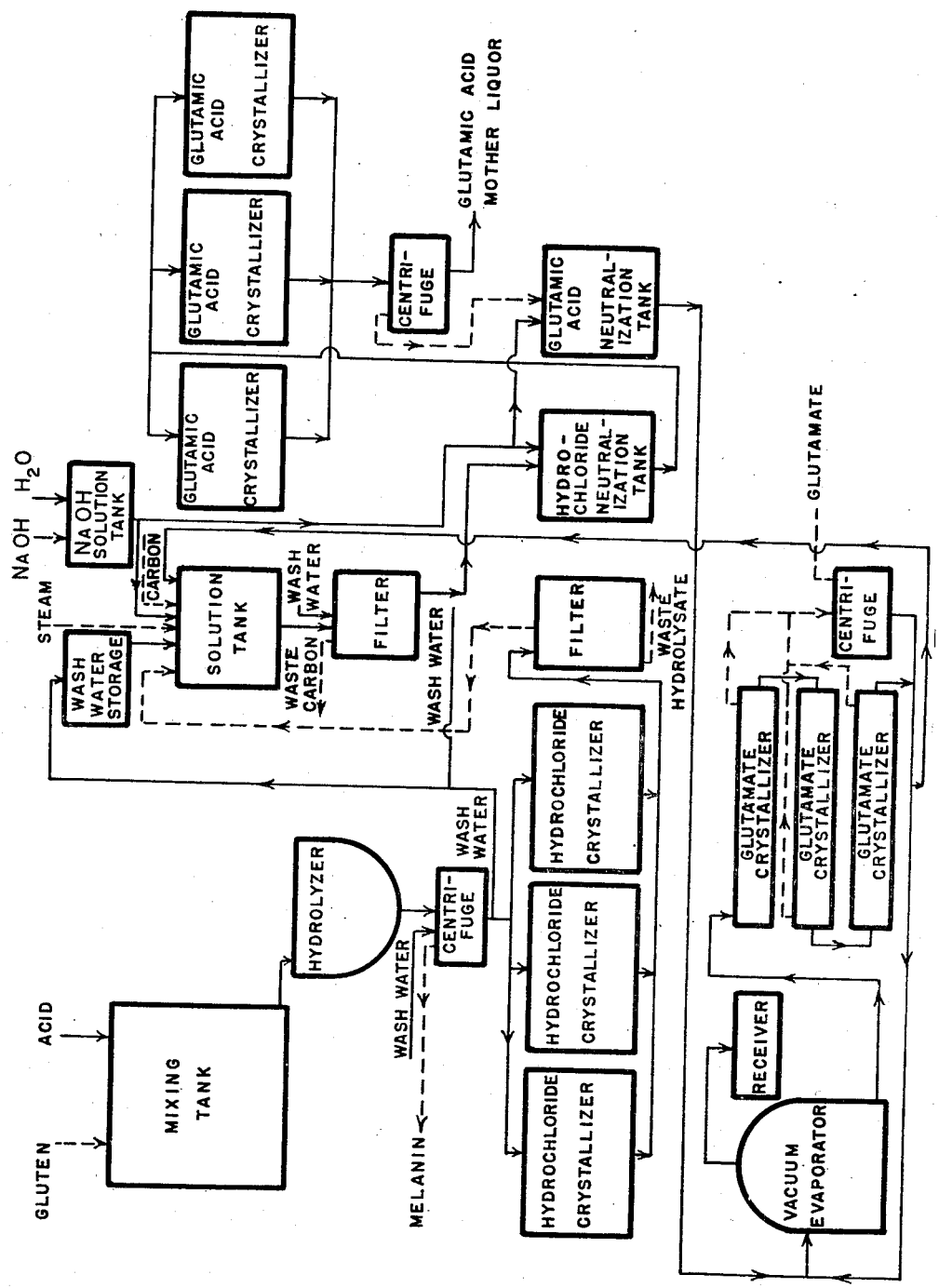

2,380,890

UNITED STATES PATENT OFFICE 2,380,890

PREPARATION OF GLUTAMIC ACID HYDROCHLORIDE

Vern S. Waters, Minneapolis, Minn., assignor to General Mills, Inc., a corporation of Delaware Application October 13, 1941, Serial No. 414,854

1 Claim. (Cl. 260—529)

The present invention relates to a method of making monosodium glutamate by the acid hydrolysis of gluten. Various methods have been proposed for producing this product but are subject to a number of disadvantages. Yields have been low. The product heretofore produced has been relatively impure unless subjected to a cumbersome purification process. Former processes have required considerable periods of time for operation and have necessitated large investments in equipment for the production of commercial size quantities. The present invention has overcome many of these difficulties.

The present invention has for an object the preparation of monosodium glutamate in a materially shorter period of time.

Another object of the invention is to provide a simple and economical process for making monosodium glutamate in a highly purified form.

These and other objects of the invention will be apparent to those skilled in the art from the following description of the invention in connection with the drawing which is the flow sheet of the preferred embodiment of the invention.

In general, the process consists in the hydrolysis of gluten by means of relatively strong acid, preferably hydrochloric, at an elevated temperature and under pressure to convert the gluten to various amino acid hydrochlorides including glutamic acid hydrochloride. It has been found that the use of concentrated acid results in a hydrolysate containing sufficient acid so that the hydrochloride can be crystallized directly therefrom without concentrating by evaporation or by the addition of hydrogen chloride or hydrochloric acid. The use of the strong acid together with the high temperature and pressure reduces the time of hydrolysis to a fraction of that previously necessary. In addition, this combination of conditions permits the direct crystallization of the hydrochloride. The glutamic acid hydrochloride is crystallized from the mother liquor to separate it from a large part of the impurities. Following this, the crystallized hydrochloride is dissolved in water and the excess acidity, due to the hydrochloric acid adhering to the crystals, is neutralized. A pH of approximately 1.5 has been found to be desirable at this point. It has been found that by thus adjusting the acidity of the hydrochloride solution, a considerable quantity of organic impurities becomes insoluble and may be separated by filtration. Following filtration, the hydrochloride solution is further neutralized to convert it to glutamic acid at a pH of approximately 3.2, at which point glutamic acid has its lowest solubility in water and crystallizes out. The crystallized glutamic acid is then separated from the mother liquor and is neutralized to convert it to monosodium glutamate which may then be recovered by crystallization.

A more detailed description of the preferred embodiment of the invention is as follows. Although gluten from other sources may be employed, it is preferred to use wheat gluten for the present invention. This may be separated from wheat flour according to the process described in the co-pending application of Callaghan and Elverum, Serial No. 383,678, filed March 17, 1941. It has been found that the gluten resulting from the above described application may be further purified to remove additional starch and other impurities. These impurities have been responsible for the presence of an increased amount of melanin in the resultant product. Their removal accordingly has materially reduced the amount of impurities which must be separated subsequently. The gluten may be purified by boiling it with water or injecting live steam into it. The starch is thus made soluble and may be removed by washing. Another method of removing starch and fibrous material is to make a suspension of gluten by means of either dilute acid or alkali in which the starch and fibrous materials remain insoluble and may be separated, for example, by centrifuging. Since the hydrolysis is preferably carried out by means of concentrated acid, it is preferred to start with dry gluten so as to avoid the high moisture content ordinarily encountered in wet gluten.

The preferred hydrolyzing acid is hydrochloric although other strong mineral acids may be employed. It is preferred that the concentration of hydrogen chloride in the acid be between 30 and 35 per cent. However, any concentrations which result in a hydrolysate containing a minimum of about 25 per cent acid may be utilized since this is approximately the minimum concentration of hydrochloric acid necessary to effect a substantially complete crystallization of the glutamic acid hydrochloride. If lower strength acids are used, the hydrogen chloride concentration in the hydrolysate would have to be increased to bring it up to this figure. This usually entails cumbersome and expensive operations. It will be apparent that acids of greater concentration than 35 per cent may also be employed. However, they are not ordinarily commercially available and accordingly the price of such concentrated acids is usually higher than lower strength acids. The dried gluten is mixed with approximately twice its weight of 35 per cent hydrochloric acid in a suitable mixing tank equipped with a slow speed agitator. After the acid and gluten are thoroughly mixed, the jelly-like mass is allowed to stand for approximately four hours, or until the mass turns to a purple sirupy liquid. At this point it may be run into the hydrolyzer which is capable of withstanding substantial pressures. Heat is applied and the temperature is allowed to rise until the internal pressure reaches, for example 45 pounds gage, at which point it is maintained for approximately two hours. The temperature corresponds to the boiling point of the acid at that pressure. Pressures above and below this range may likewise be employed, the higher pressures reducing the time at the expense of the hazards encountered in higher pressures and the lower pressures increasing the time depending upon the degree of reduction of pressure. It will be understood that a pressure in excess of atmospheric should be employed in order to prevent the escape of any substantial quantities of hydrogen chloride.

Following the hydrolysis the heat is turned off and the hydrolyzer is preferably cooled until the internal pressure becomes atmospheric. This prevents to a large degree vaporization of hydrogen chloride. The free acid concentration at this point should be at a minimum of about 25 per cent, which is the minimum desirable for separation of glutamic acid hydrochloride for the reason that below this concentration, the hydrochloride becomes increasingly soluble and the recovery drops off rapidly. The hydrolysate is dark in color and is filtered hot since it then possesses a low viscosity and since the hydrochloride crystallizes rapidly upon cooling. Filtration may be accomplished in the centrifuge basket in which the black insoluble humus portion is left behind. The filtrate containing the glutamic acid hydrochloride is then allowed to stand for approximately one day during which the hydrochloride precipitates in very fine crystals. These may be separated from the mother liquor by filtration. The crystals are found to be dark in color and are wet with free hydrochloric acid. A preliminary purification may be made by washing the impure crystals with fresh hydrochloric acid which is then to be used as the hydrolyzing agent for a subsequent batch. Following the filtration, the hydrochloride is dissolved in water, and sufficient alkali, such as sodium hydroxide, is added to neutralize the free hydrochloric acid adhering to the crystals. The resulting pH is preferably about 1.5. It is preferred to inject live steam in order to facilitate the dissolving of the hydrochloride as well as to raise the temperature sufficiently to increase the action of the decolorizing carbon to be added. The water employed in this step, including the steam condensed and the water for dissolving the sodium hydroxide, should be about one and one-half times the weight of the glutamic acid hydrochloride. Decolorizing carbon is then added to remove color from the solution. It will be apparent that the amount of carbon to be added depends upon conditions and the optimum can be readily determined for any particular set of conditions. During the decolorizing a temperature of from 80 to 90° C. is preferred. Furthermore, the solution should be agitated for at least fifteen minutes.

The resulting solution is then filtered and the filtrate is found to be practically colorless. The filtrate is allowed to cool to room temperature at which point an acid neutralizing agent such as sodium hydroxide, carbonate, or bicarbonate, is added until a pH of about 3.2 is obtained. It is desirable to add the base sufficiently slowly so that the temperature does not exceed 60 to 70° C. The solution is allowed to stand until crystallization is substantially complete. The glutamic acid crystals may then be separated, for example, by means of a centrifuge. A sodium hydroxide solution may then be added to the glutamic acid slowly, so as to prevent temperatures above 60 to 70° C., until a pH of 7.0 is attained. The resulting solution of monosodium glutamate may then be evaporated and concentrated preferably under a vacuum until a suitable concentration for crystallization has been reached. The concentrated solution may then be run into a crystallizer where it may be allowed to crystallize. The resulting crystals may be separated by a centrifuge and the crystals removed and dried in a suitable drier.

Before the process reaches the glutamic acid stage, temperatures as high as the boiling point may be employed. However, during the glutamic acid and monosodium glutamate stages, temperatures below 60° C. are preferred in order to prevent racemization.

The drawing illustrates a flow sheet of the present invention and shows the utilization which may be made of the various mother liquors and wash waters resulting from the process. The gluten and acid are added to the mixing tank from which they flow to the hydrolyzer. After hydrolysis, the mixture is passed to a centrifuge where the hydrolysate containing the glutamic acid hydrochloride is separated from solid impurities called melanin. The melanin is then washed with water to remove as much as possible the adhering hydrolysate, after which the wash water is passed to the wash water storage tank. The hydrolysate separated in the centrifuge may be run into the hydrochloride crystallizers wherein crystallization is allowed to occur. The resultant mass is then agitated in order to secure a uniform suspension of crystals and is then passed to a filter wherein the glutamic acid hydrochloride crystals are separated from the acid hydrolysate. The latter may be run to waste or may be treated to recover by-products such as other amino acids. The glutamic acid hydrochloride crystals are then passed to the solution tank where wash water from the centrifuge, steam, sodium hydroxide to neutralize free hydrochloric acid, additional water and activated carbon may be added. The resultant solution is then filtered and the separated solids discarded after having been washed with water. The wash water may be returned to the wash water storage tank. The filtrate is run to the hydrochloride neutralization tank where sufficient sodium hydroxide solution to form glutamic acid is added. The neutralized solution is then run to the glutamic acid crystallizer wherein crystallization is allowed to occur. The crystals may be separated from the mother liquor in a centrifuge and are then passed to the glutamic acid neutralization tank to be converted into monosodium glutamate. The glutamic acid mother liquor which contains a small amount of glutamic acid soluble in water, the sodium chloride formed by the neutralization of the glutamic acid hydrochloride and the ammonium chloride which precipitates with the glutamic acid hydrochloride, is discarded to waste. The monosodium glutamate solution is then run to the vacuum evaporator from which it passes to the glutamate crystallizer. The glutamate crystallizing out may be separated from the mother liquor in a centrifuge and then may be dried. The mother liquor from which the glutamate has been separated is returned to the vacuum evaporator for further concentration. This recycling of the mother liquor may be continued until the impurities contained therein accumulate to such an extent that contamination is apt to result from further recycling. At this point it may be returned to the glutamic acid hydrochloride solution tank and processed along with crude glutamic acid hydrochloride to remove impurities and recover the monosodium glutamate. In the drawing, the flow of liquids is indicated by a solid line and the flow of solids is indicated by a broken line.

The above detailed description has been merely illustrative and it will be apparent that modifications thereof may be employed without departing from the spirit of the invention. For example, any suitable method of crystallizing and filtering may be substituted for those described. Furthermore, the operation may be conducted entirely as a batch operation or may be made continuous. As an alternative various parts of a process may be run in a continuous manner while others may be run batch. Thus each step of the process may be run in a truly continuous manner, or each may be semi-continuous as exemplified by the crystallizers shown on the drawing, wherein one crystallizer may be in the process of crystallizing while another containing crystallized material is feeding into the filter and while a third is receiving hydrolysate for crystallization. In this way the process as a whole may be continuous while some steps are actually batch.

It will be apparent from the herein contained description that the process accomplishes a rapid and economical preparation of monosodium glutamate of high purity. Concentrated acid is employed from the start and it does not escape during the pressure hydrolysis. Thus the hydrolysate contains the same concentration of acid as the original except for acid consumed in producing the hydochloride. The concentration of acid in the hydrolysate is still sufficient to effect a crystallization directly without concentrating the acid. Thus the cumbersome concentrating step is avoided. In addition, since no acid is boiled away either during the hydrolysis or during a concentrating step, it is evident that the present invention makes efficient use of the acid and that a maximum yield per unit acid is obtained. Further, there is a substantial saving in alkali over processes which neutralize the hydrolysate directly to glutamic acid without crystallization of the hydrochloride. In addition, the preliminary and subsequent purification steps result in a highly purified product with a minimum of effort.

While various modifications of the invention have been described in detail, it is understood that the invention is not to be limited thereto but may be varied within the scope of the following claim.

I claim as my invention:

A process of hydrolyzing gluten for the production of glutamic acid which comprises subjecting gluten to the action of hydrochloric acid containing in excess of 25 per cent hydrogen chloride, under superatmospheric pressure for a sufficient period of time to effect a substantial hydrolysis while preventing the escape of hydrogen chloride gas, and crystallizing the resultant glutamic acid hydrochloride from the hydrolyzate while said hydrolyzate contains hydrogen chloride in a concentration not less than about 25 per cent.

VERN S. WATERS.